(12) United States Patent
Delwal et al.

(10) Patent No.: US 8,960,741 B2
(45) Date of Patent: Feb. 24, 2015

(54) ASSEMBLY COMPRISING A BUMPER SKIN AND MASKING MEANS

(75) Inventors: Fabien Delwal, Chalamont (FR); Hugues Cheron, Meximieux (FR)

(73) Assignee: Compagnie Plastic Omnium, Lyons (FR)

(*) Notice: Subject to any disclaimer, the term of this patent is extended or adjusted under 35 U.S.C. 154(b) by 903 days.

(21) Appl. No.: 12/677,463

(22) PCT Filed: Sep. 9, 2008

(86) PCT No.: PCT/FR2008/051607
§ 371 (c)(1),
(2), (4) Date: Jul. 27, 2010

(87) PCT Pub. No.: WO2009/044071
PCT Pub. Date: Apr. 9, 2009

(65) Prior Publication Data
US 2011/0049930 A1    Mar. 3, 2011

(30) Foreign Application Priority Data
Sep. 10, 2007  (FR) ..................... 07 57465

(51) Int. Cl.
*B60R 11/00* (2006.01)
*B60R 19/02* (2006.01)
*B05B 13/02* (2006.01)
*B60R 19/18* (2006.01)

(52) U.S. Cl.
CPC ........... *B60R 19/023* (2013.01); *B05B 13/0285* (2013.01); *B60R 2019/1886* (2013.01)
USPC ... 293/115; 293/102; 296/193.1; 296/193.09; 296/187.09

(58) Field of Classification Search
USPC ............. 296/193.1, 193.09, 187.09; 293/115, 293/102, 120
See application file for complete search history.

(56) References Cited

U.S. PATENT DOCUMENTS 4,364,591 A * 12/1982 Bien .............................. 293/102
4,466,646 A *  8/1984 Delmastro et al. ............ 293/117
5,984,389 A   11/1999 Ag et al.

(Continued)

FOREIGN PATENT DOCUMENTS

DE           19637512 A1   11/1999
DE    10 2005 011 827 A1   10/2006

(Continued)

OTHER PUBLICATIONS

International Search Report of PCT/FR2008/051607; May 26, 2009; Douhet, Herve.

(Continued)

*Primary Examiner* — Joseph D Pape
(74) *Attorney, Agent, or Firm* — BCF LLP

(57) ABSTRACT

The assembly is for mounting to a motor vehicle having a bumper skin and it comprises a body part forming at least a portion of a bumper skin. The body part is defined by bottom and top edges. The top edge includes a first portion to be masked by a member of the vehicle that is to be fitted to the body part. The assembly includes at least a first masking element masking at least one portion of the bottom edge and at least a second masking element masking at least one second portion of the top edge of the body part, complementary to the at least one first portion of the top edge of the body part. The first and second masking elements are fixed relative to the body part once the assembly is mounted to the motor vehicle.

13 Claims, 5 Drawing Sheets

(56) References Cited

U.S. PATENT DOCUMENTS

| | | |
|---|---|---|
| 6,511,109 B1 | 1/2003 | Schultz et al. |
| D544,418 S | 6/2007 | Kono |
| 2004/0224099 A1 | 11/2004 | Grossklaus |

FOREIGN PATENT DOCUMENTS

| | | |
|---|---|---|
| DE | 19912181 A1 | 3/2008 |
| EP | 0703008 A2 | 3/1996 |
| EP | 1036730 A3 | 7/2004 |
| JP | 2005297707 A | 10/2005 |
| WO | 200709572 A1 | 8/2007 |
| WO | 2008006495 A1 | 1/2008 |

OTHER PUBLICATIONS

Diederichs Karosserietelle GmbH—Hauptkatalog (main catalogue) 2004; pp. 510, 518, 522, 523, 524, 526.

Der neue BMW 1er (the new BMW series 1 ATZ/MTZ) special edition Oct. 2004; pp. 14 and 150.

BMW 1er Reihe, So wird's gemacht [operating manual], BMW series 1—ISBN 978-3-7688-1838-4; 2007; p. 240.

Original Opposition memoir of EP 2 188 154 dated Jan. 4, 2013.

Machine translation of the original Opposition memoir of EP 2 188 154 dated Jan. 4, 2013.

Machine translation obtained from Espacenet of EP1 036 730, published Jul. 21, 2004.

Machine translation obtained from Espacenet of DE10 2005 011 827, published Mar. 15, 2005.

Machine translation obtained from Espacenet of WO2007090572, published Aug. 16, 2007.

Machine Translation of JP2005297707A retrieved from Espacenet on Jul. 29, 2014.

www.auto-motor-und-sport.de__news__mitsubishi-I200-fresh-u. pdf; retrieved from http://www.auto-motor-und-sport.de/seite-nicht-gefunden-649541.html on Mar. 27, 2014; published Aug. 16, 2005.

Mitsubishi Motors; Main catalog L200; Mar. 2006; printed in the Netherlands.

Mitsubishi Motors; Accessories catalog L200; Jan. 2007.

Mitsubishi Motors Deutschland GmbH; 07 Ger 41922 Mar. 2006; Printed in the Netherlands.

Stossfaenger vorne Mitsubishi L 200 KAOT, date unknown.

* cited by examiner

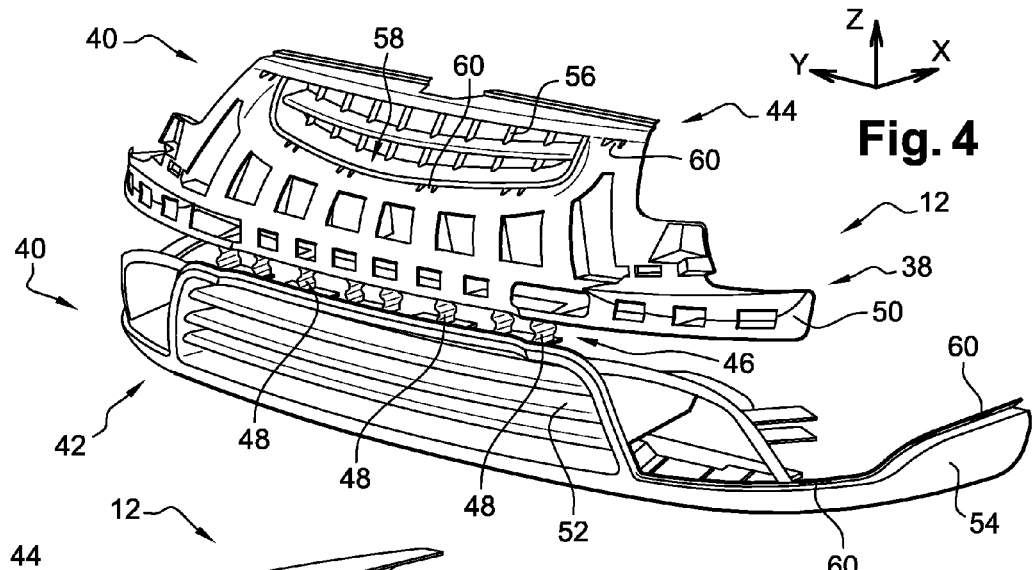
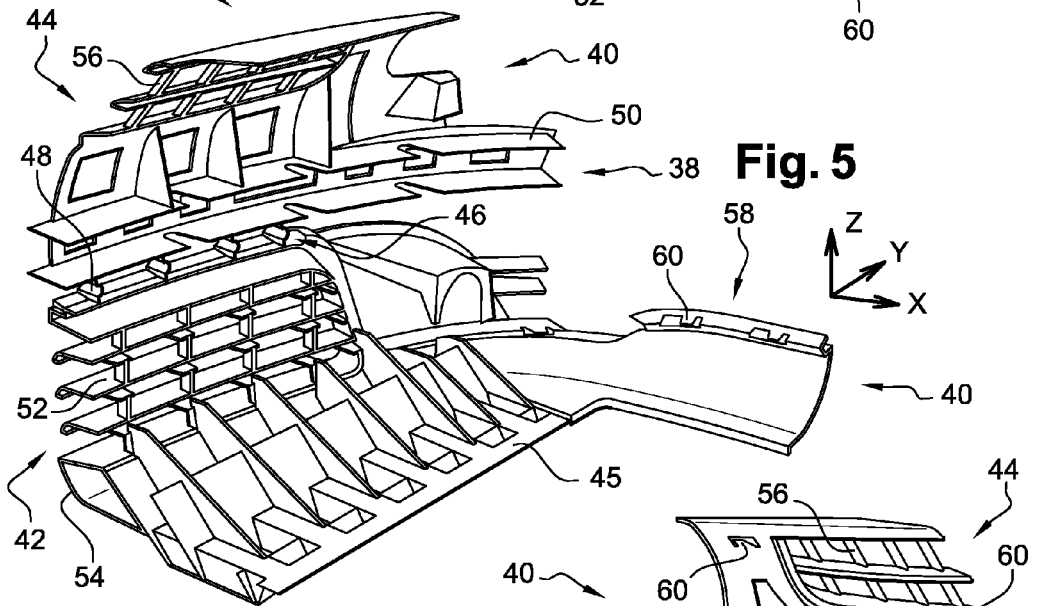
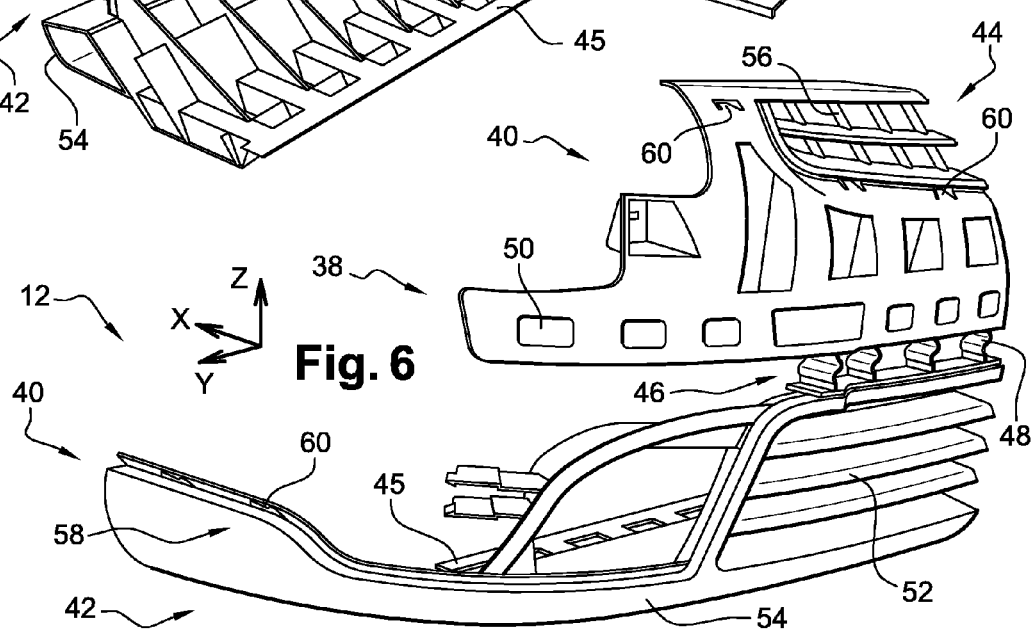

ASSEMBLY COMPRISING A BUMPER SKIN AND MASKING MEANS

CROSS-REFERENCES

The present application is a national stage entry of International Application Number PCT/FR2008/051607, filed Sep. 9, 2008 which claims priority to French Patent Application No. 07 57465, filed Sep. 10, 2007, the entirety of both of which is incorporated herein by reference.

FIELD OF THE INVENTION

The present invention relates to the field of motor vehicle bumpers.

BACKGROUND OF THE INVENTION

In the state of the art, a body part is already known that forms a bumper skin. The bumper skin has a face that is visible from outside the vehicle and it is defined by bottom and top transverse edges. The bumper skin is also defined by side edges. A portion of each side edge is connected to each fender of the vehicle and another portion defines at least a fraction of each wheel arch. These transverse and side edges may include portions that are rectilinear or curved, concave or convex, depending on the style of the bumper skin.

Once the bumper skin has been mounted on the vehicle, the top edge has two portions that are masked by members that are fitted to the vehicle, e.g. two head light assemblies. The portion of the top edge that is complementary to the two portions masked by the light units can be seen by the user of the vehicle, in particular when the motor vehicle is in a hood-open position.

In order to guarantee that the vehicle presents good appearance and good perceived quality, the top and bottom edges form rims that extend substantially in register with the visible face of the bumper skin to which they are connected. The rim formed by the top edge enables the vehicle to be given good finish, in particular when the vehicle hood is open, whereas the rim that is formed by the bottom edge generally serves to contribute to the style of the vehicle.

While the bumper skin is being painted, a plurality of bumper skins are arranged on a vertical support in a painting installation so that the bottom and top transverse edges of two successive parts are adjacent.

In order to paint each bumper skin completely, in particular its visible face and the rims formed by the edges, it is common practice to use paint-applicator robots that are suitable for moving along a three-dimensional path. Firstly, such robots are very expensive and very complex to control. Secondly, since the part is three-dimensional, the time required for applying paint is relatively long. Finally, the gaps between the skins on a given support need to be relatively wide to allow the robots to pass between the skins in order to apply paint to the rims formed by the edges. These gaps between the skins reduce the number of skins that can be placed on the support and thus reduce the throughput of the painting installation.

OBJECT AND SUMMARY OF THE INVENTION

An object of the invention is to simplify the method of painting the bumper skin.

To this end, the invention provides an assembly for mounting to a motor vehicle having a bumper skin, the assembly comprising a body part forming at least a portion of the bumper skin of the motor vehicle once mounted to the motor vehicle. The body part is defined by bottom and top edges, the top edge including at least one first portion to be masked by at least one member of the motor vehicle that is to be fitted to the body part after the body part has been mounted to the motor vehicle. The assembly also includes at least one first masking element masking at least one portion of the bottom edge of the body part, and at least one second masking element masking at least one second portion of the top edge of the body part, complementary to the at least one first portion of the top edge of the body part, the at least one second portion of the top edge of the body part being different from the at least one first portion of the top edge of the body part, the at least one first masking element and the at least second masking element being fixed relative to the body part once the assembly is mounted to the motor vehicle.

Such a bodywork part is suitable for being painted by a method that is simple.

The top and bottom transverse edges of the body part are masked from one side edge to the other by the least one member of the motor vehicle that is to be fitted to the body part after the body part has been mounted to the motor vehicle, and by the at least one first and at least one second masking elements, so there is no need to paint the rims formed by the top and bottom edges. It is then possible to use a body part that presents transverse edges that do not form rims.

Because there is no need to paint the rims formed by the transverse edges, it becomes possible firstly to reduce the gaps between the body parts on a common support and thus to place a relatively large number of body parts on a painting support, and secondly to use paint applicator robots that are capable of moving on a path that is two-dimensional only, thus enabling paint to be applied relatively quickly using robots of cost that is relatively low and of operation that is relatively simple. Such robots may be constituted, for example, by two-dimensional reciprocators.

According to an optional characteristic of the assembly of the invention, the at least one member of the motor vehicle masking the at least one first portion of the top edge of the body part comprises ahead light assembly light unit.

According to another optional characteristic of the assembly of the invention, the body part is shaped such that when a first other body part identical to the body part and a second other body part identical to the body part are mounted vertically on top of each other, each of the body part, the first other body part and the second other body part being in the utilization position of the body part on the vehicle, the first other body part being mounted above the body part, and the second other body part being mounted below the body part:

any portion of the top edge of the body part which is convex when projected onto a plane perpendicular to the longitudinal direction in the utilization position of the body part on the vehicle, has a corresponding portion on the bottom edge of the first other body part which is at least one of concave and flat when projected onto the plane, and any portion of the bottom edge of the body part which is at least one of concave and flat when projected onto the plane, has a corresponding portion on the top edge of the second other body part which is convex when projected onto the plane.

According to another optional characteristic of the assembly of the invention, the body part is shaped such that when a first other body part identical to the body part and a second other body part identical to the body part are mounted vertically on top of each other, each of the body part, the first other body part and the second other body part being in the utilization position of the body part on the vehicle, the first other body part being mounted above the body part, and the second other body part being mounted below the body part:

any portion of the top edge of the body part which is at least one of concave and flat when projected onto a plane perpendicular to the longitudinal direction in the utilization position of the body part on the vehicle, has a corresponding portion on the bottom edge of the first other body part which is convex when projected onto the plane, and any portion of the bottom edge of the body part which is convex when projected onto the plane, has a corresponding portion on the top edge of the second other body part which is at least one of concave and flat when projected onto the plane.

Such a configuration of body parts serves to optimize the space occupied by the body parts on a painting support and thus to increase the number of body parts that can be placed on the painting support. Each body part is formed in such a manner that the top and bottom edges follow, at least in certain portions, trajectories that are substantially parallel, thereby enabling the space occupied by the set of superposed body parts to be optimized with the bottom and top edges of two successive body parts facing each other.

Optionally, the bottom edge defines at least one recess formed in the body part, and the top edge defines at least one projection forming a visible portion of the body part once mounted on the motor vehicle, the body part being formed such that the at least one projection of the body part is suitable for being positioned in the at least one recess of the first other body part; and the at least one recess of the body part is suitable for receiving the at least one projection of the second other body part.

Such body parts may be interleaved in one another during the painting process, thereby making it possible to further increase the number of body parts that can be placed on a painting support.

In addition, since the recess is suitable for receiving the at least one projection of another body part, passing the paint applicator in the vicinity of the recess serves also to paint the at least one projection of the other body part positioned in the recess, thereby making it possible to reduce the conventional losses of paint that are associated with applying paint in the vicinity of the edges of the body parts for painting.

According to an optional characteristic of the assembly of the invention, the at least one first masking element and the at least one second masking element are integrally molded together.

Optionally, the at least one first masking element and the at least one second masking elements are made of plastic material.

Optionally, the at least one first masking element and the at least one second masking element are connected together by elastically deformable connecters.

When the at least one first and the at least one second masking elements are integrally molded together, the deformable connecters enable the position of the at least one first and the at least one second masking elements to be adjusted relative to the body part by deforming the connecters elastically. The connecters—thus enable the masking elements to be applied to the body part in spite of possible dimensional variations between the body part and the masking elements.

According to another optional characteristic of the assembly of the invention, the assembly further comprises a support part supporting the body part including a support portion supporting the body part; and a visible portion that is visible from outside the vehicle once the assembly is mounted to the motor vehicle, the visible portion having the at least one first masking element and the at least one second masking element.

The support part thus performs the function of masking the bottom edge and the complementary portion of the top edge, and also the function of supporting the bumper skin. The support part may also include other portions suitable for performing other functions, e.g. absorbing impacts.

Advantageously, the body part further comprises integrally molded fasteners fastening the body part to the at least one first masking element and to the at least one second masking element.

Such fastener elements enable a body part to be fabricated at low cost.

According to an optional characteristic of the assembly of the invention, at least one of the at least one first masking element and the at least one second masking element includes at least one aesthetic element. Optionally, the aesthetic element is an air inlet grille.

Thus, by having different models available for the at least one first and the at least one second masking elements with at least one aesthetic element that correspond to different levels within a range, it is possible to obtain different levels of the range for the assembly merely by changing at least one of the at least one first and the at least one second masking elements.

Optionally, the body part includes at least one fastener for fastening the body part to at least one other identical body part when such body parts are not assembled to a motor vehicle.

The invention also provides a motor vehicle comprising an assembly as defined above.

The invention also provides a method of painting at least a first and a second body parts, the first and second body parts being identical to each other, each of the first and second body part being designed to form at least a portion of a vehicle bumper skin, each of the first and second body part being defined by bottom and top edges, the top edge of each of the first and second body part including at least one portion to be masked by at least one member of the vehicle after the part has been mounted on the vehicle, the method comprising applying paint to each of the first and second body parts with an applicator that is movable in at most two dimensions.

Advantageously, the second body part is suspended to the first body part.

It is thus possible to secure the second body part to the first body part without an intervening paint support, but directly by suspending the second body part to the first body part. It is thus possible to make provision for suspending a plurality of body parts successively from one another, with the topmost body part being the only one that is suspended from a support.

BRIEF DESCRIPTION OF THE DRAWINGS

The invention can be better understood on reading the following description given purely by way of non-limiting example and made with reference to the drawings, in which:

FIG. 4 is a perspective view of a support part of the FIG. 2 assembly;

FIG. 5 is a fragmentary perspective view of the FIG. 4 support part;

FIG. 6 is another perspective view of the FIG. 5 support part;

MORE DETAILED DESCRIPTION

In FIGS. 1 to 6, there can be seen mutually orthogonal axes X, Y, Z corresponding to the conventional longitudinal, transverse, and vertical orientations X, Y, and Z of a vehicle. The longitudinal axis is oriented from the front towards the rear of the vehicle.

Figure 1:
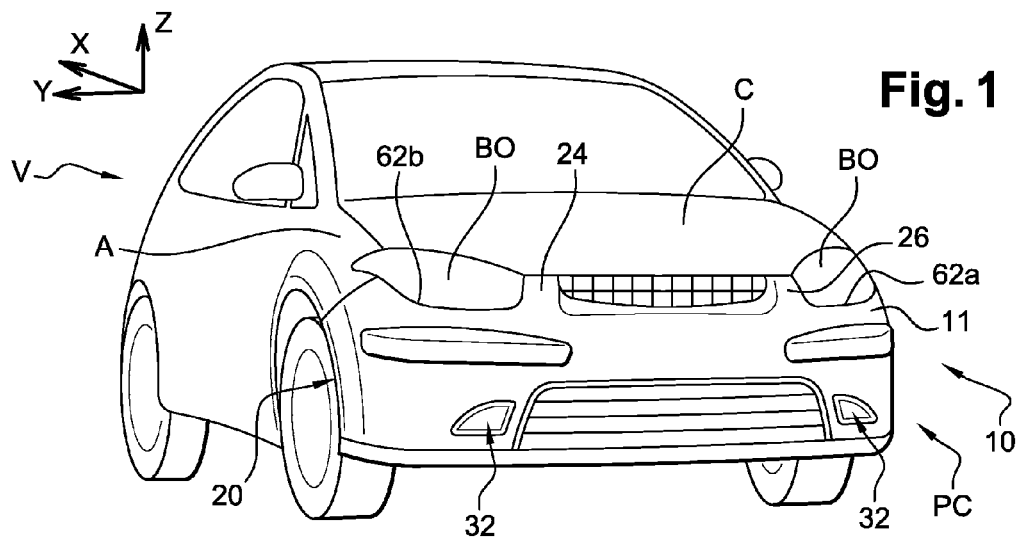
FIG. 1 is a perspective view of a motor vehicle of the invention.

FIG. 1 shows a motor vehicle of the invention given overall reference V.

Figure 2:
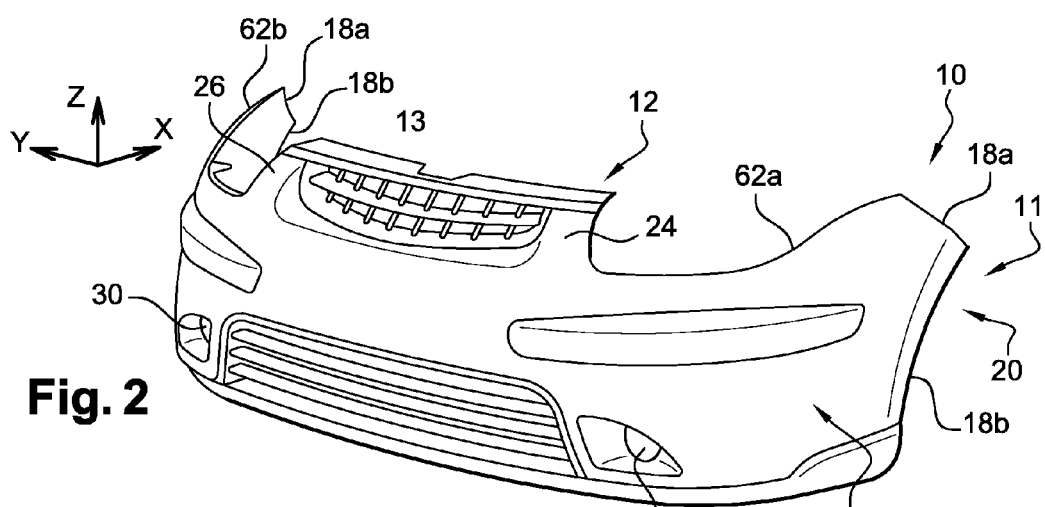
FIG. 2 is a perspective view of an assembly of the invention.

The vehicle V includes a front assembly 10 that is mounted on the motor vehicle and that is shown in FIG. 2. The assembly 10 includes a body part 11 forming a portion of a bumper skin PC of the vehicle and a support part 12 for supporting the body part 11, as shown in FIGS. 4 and 6. The vehicle V also has other body parts such as a hood C that is movable relative to the body part 11, and fenders A. The vehicle V also has two head light assembly BO disposed substantially symmetrically about a longitudinal midplane of the vehicle that is substantially parallel to the XZ plane.

Figure 3:
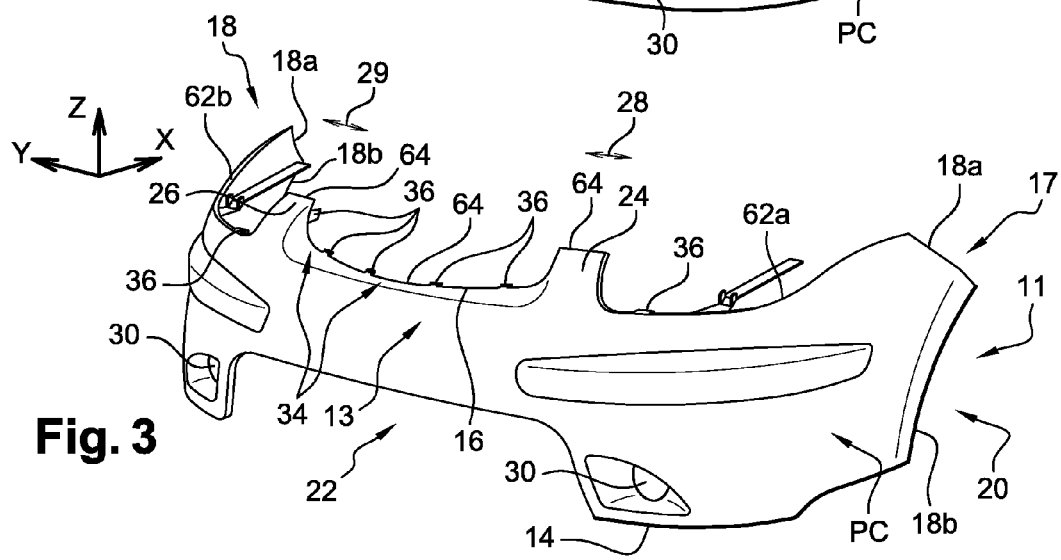
FIG. 3 is a perspective view of a body part of the FIG. 2 assembly.

As also shown in FIGS. 2 and 3, the body part 11 has a face 13 that is visible from outside the vehicle V and that is defined by bottom and top transverse edges 14 and 16. The body part 11 is also defined by two side edges 17 and 18. Each side edge 17 or 18 has a first portion 18a connected to a corresponding fender A and a second portion 18b that defines at least part of each wheel arch 20. The edges 14 and 16 form rims that extend substantially perpendicularly relative to the visible face 13. These rims are of a size that is less than or equal to 10 millimeters (mm), or less than or equal to 7 mm, preferably less than or equal to 5 mm.

The bottom edge 14 of the body part 11 defines a recess 22 formed in the body part. This recess extends in the Y direction over about half of the width d of the body part 11, and in the Z direction over about one-third of the height of the body part 11. The top edge 16 defines two projections 24 and 26 forming two portions of the body part 11 that are visible once it is mounted on the vehicle, as shown in FIG. 1. The two projections 24 and 26 extend substantially in the vertical direction Z and they are disposed symmetrically about the longitudinal midplane of the vehicle V. Each projection extends in the Y direction over a fraction 28, 29 of the top edge 16 situated remote from the recess 22 relative to a horizontal midplane of the body part 11, parallel to the XY plane.

The body part 11 also has two orifices 30 for passing lower light members 32, specifically fog lamps.

As shown in FIG. 3, the body part 11 has fastener means 34 for fastening it to the support part 12. These fastener means 34 are integrally molded with the body part 11. Specifically, since the body part 11 is molded out of a plastics material, the fastener means 34 include resilient fastener elements such as clips 36.

FIGS. 4, 5, and 6 show the support part 12. The support part 12 is molded as a single piece, preferably out of a plastics material, in particular an injected plastics material. The support part 12 has a portion 38 for supporting the body part 11 and situated facing the body part 11, behind it once the assembly 10 is mounted on the vehicle V. The support part 12 also includes a portion 40 that is visible from outside the vehicle V once the assembly 10 is mounted thereon. This portion 40 has first and second elements 42 and 44 for fastening to the body part 11 by the means 34. Finally, the support part 12 has a bottom converging portion 45 that serves to guide air, and possibly also to absorb impacts.

The portion 38 has connecters 46 for connecting the first and second elements 42 and 44 together. These connecters 46 are elastically deformable and include a plurality of connection members 48 that are distributed in the Y direction between the first and second elements 42 and 44. In a plane parallel to the YZ plane, each member 48 presents an undulating section. The portion 38 also has an impact absorber member 50 designed to receive an impact beam.

The first element 42, situated towards the bottom of the assembly 11, has an air-inlet grille 52 and a spoiler 54. The second element 44, situated towards the top of the assembly 11 includes an aesthetic element, in particular an upper grille 56. Each element 42, 44 further includes fastener means 58 for fastening the support part 12 to the body part 11, said means 58 being complementary to the means 34. Specifically, the means 58 comprise orifices 60 for receiving the clips 36.

As shown in FIG. 2, the bottom edge 14 is masked from the side edge 17 to the side edge 18 by the first element 42, which thus forms a first masking element for masking the bottom edge 14 of the body part 11. Specifically, the air-inlet grille 52 masks the bottom edge of the recess 22.

As shown in FIGS. 1 to 3, the top edge 16 has two portions 62a, 62b that are masked by two members of the vehicle once the body part 11 has been mounted on the vehicle V, specifically the head light assembly BO. The top edge 16 also has a portion 64, complementary to the portions 62a, 62b such that the portions 62a, 62b, and 64 form the edge 16 that extends from the side edge 17 to the side edge 18. The portion 64 of the edge 16 is masked by the second element 44, which thus forms a second masking element for masking the portion 64 of the top edge 16. Once mounted to the body part 11, the first and second masking elements 42 and 44 are fixed relative to the body part.

Figure 9:
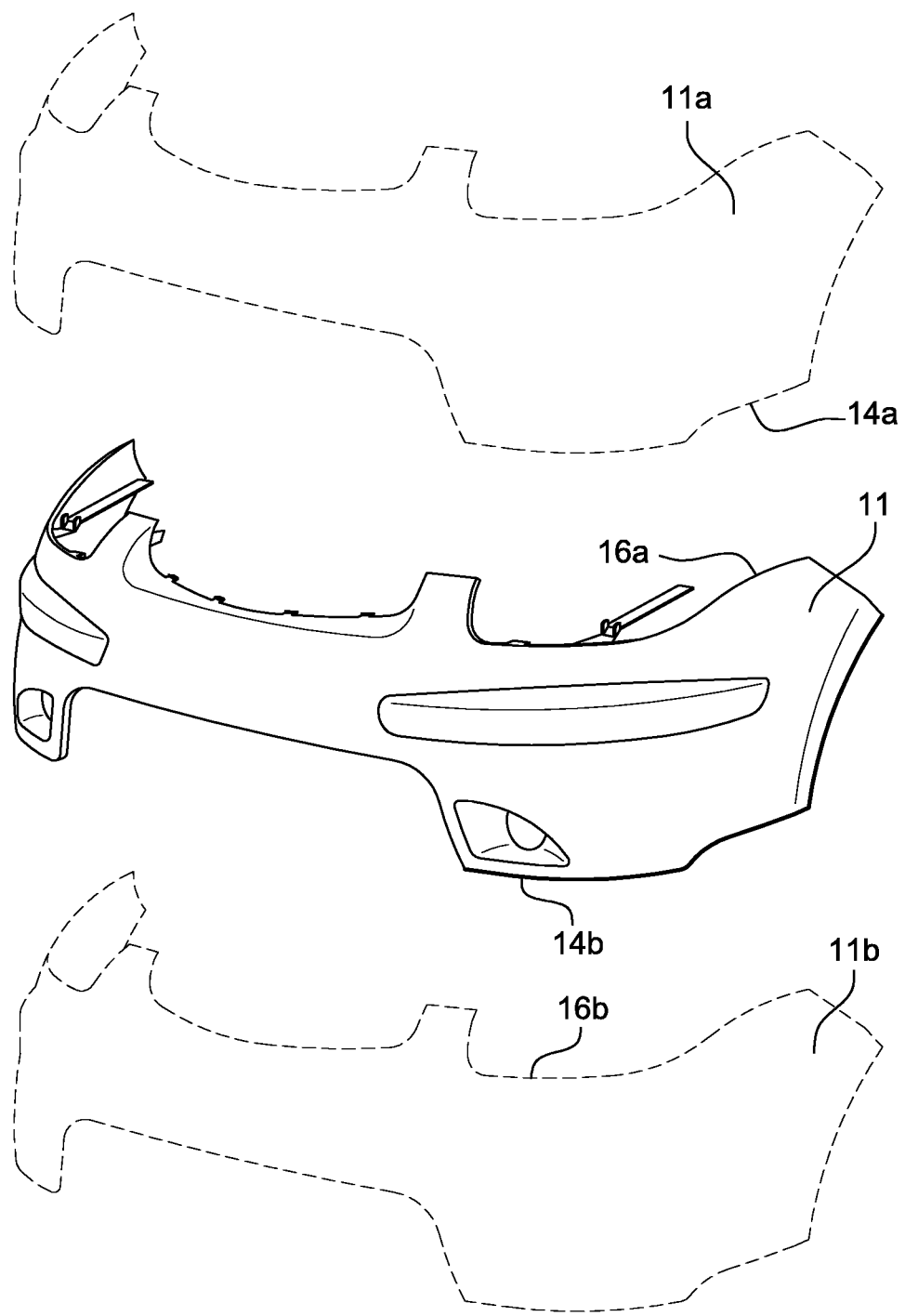
FIG. 9 is a perspective view of the FIG. 3 body part together with first and second body parts that are equivalent to moving said body part in translation respectively upwards and downwards.

As shown in FIG. 9, the body part 11 is shaped in such a manner that any portion 16a of the top edge 16 of the body part as projected onto a transverse projection plane perpendicular to the longitudinal direction and substantially parallel to the YZ plane, and defining a non-plane convex projected portion of the body part, faces a portion 14a of the bottom edge as projected onto the transverse projection plane, and defining a concave or plane portion of the first body part 11a. This first body part 11a, drawn in dashed outline in FIG. 9, is equivalent to moving the body part 11 in translation upwards from its utilization position on the vehicle.

The body part 11 is also formed in such a manner that any portion of the bottom edge 11b as projected onto the projection plane in the utilization position on the vehicle and defining a convex non-plane projected portion of the body part faces a portion 16b of the top edge as projected onto the transverse plane and defining a concave or convex portion of a second body part 11b. This second body part 11b, likewise drawn in dashed lines in FIG. 9, is equivalent to moving the body part 11 in translation downwards in the utilization position on the vehicle.

The body part 11 of the assembly 10 of the invention is suitable for being painted by a painting method, with the main aspects thereof that are associated with the invention being described below.

Figure 7:
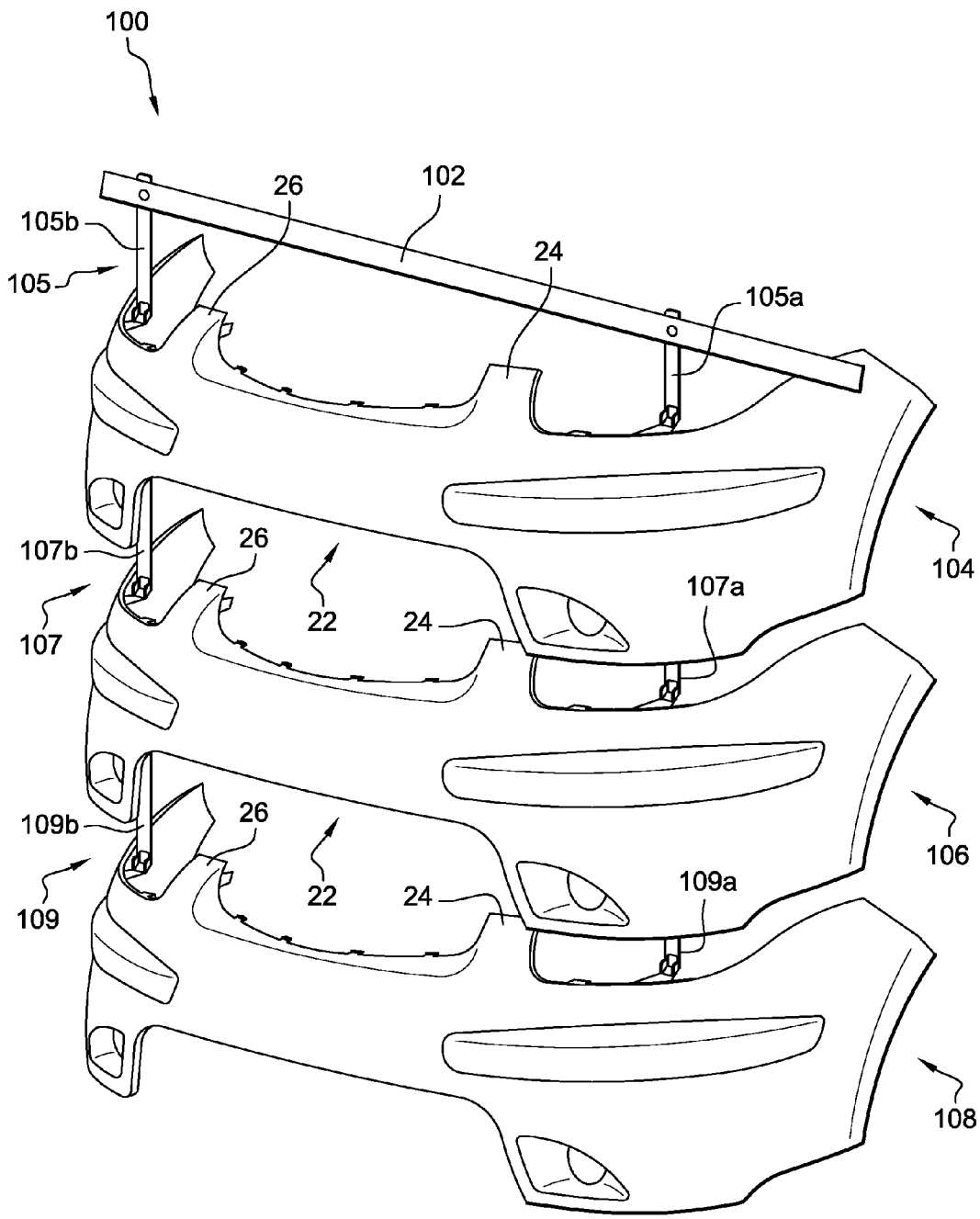
FIG. 7 is a perspective view of a set of body parts painted by a painting method in a first implementation.

FIG. 7 shows a set of body parts 11 painted by a painting method in a first implementation of the invention.

The painting installation 100 includes a hanger-forming support 102. First, second, and third body parts for painting given respective references 104, 106, and 108 are suspended from the support 102. These three body parts are mutually identical. Specifically, the body part 104 is equivalent to moving the second body part 106 upwards from its utilization position on the vehicle, and the body part 108 is equivalent to moving the body part downwards from its utilization position on the vehicle. This movement includes movement in translation, possibly associated with movement in rotation of a few degrees about an axis substantially parallel to the transverse axis Y.

Each body part has fastener means for fastening each body part to at least one other identical body part. Specifically, the first body part 104 is suspended from the support 102 by first suspension means 105, the second body part 106 is suspended from the first body part 102 by second suspension means 107, and the third body part 108 is suspended from the second body part 106 by third suspension means 109.

The suspension means 105, 107, and 109 respectively comprise rods 105a & 105b, 107a & 107b, and 109a & 109b. These rods are preferably made of plastics material. The rods 105a and 105b are fastened to the top portion of the body part 104. The rods 107a and 107b are fastened to the top portion of the body part 106 and are fastened to the bottom portion of the body part 104. In analogous manner, the rods 109a and 109b are fastened to the top portion of the body part 108 and to the bottom portion of the body part 106.

As shown in FIG. 7, where the first, second, and third body parts 104, 106, and 108 are superposed one above another in this order, each body part 104, 106, and 108 is made in such a manner that the projections 24, 26 of the second and third body parts 106 and 108 are suitable for being positioned in the recesses 22 of the first and second body parts 104 and 106 respectively. The recesses 22 of the first and second body parts 104 and 106 are suitable for receiving the projections respectively of the second and third body parts 106 and 108.

Advantageously, the rods are releasably fastened to the fastener means 34 of two consecutive body parts. Thus, the body parts are painted by means of an applicator that is movable in at most two dimensions, e.g. a reciprocator, and after the painting step, the rods are removed.

In a variant, the rods may be movable between:
 a suspension position used in a step of applying a composition, e.g. a step of painting the body part during which the body part that carries them is suspended from the body part situated above; and
 a spacing-apart position (FIG. 3) used in a step of transporting the body part, in which step the rod serves to maintain a fixed spacing between two consecutive body parts.

In a variant, the body parts 104, 106, and 108 may be suspended from two continuous wire elements, e.g. cables that are fastened to the support 102.

Figure 8:
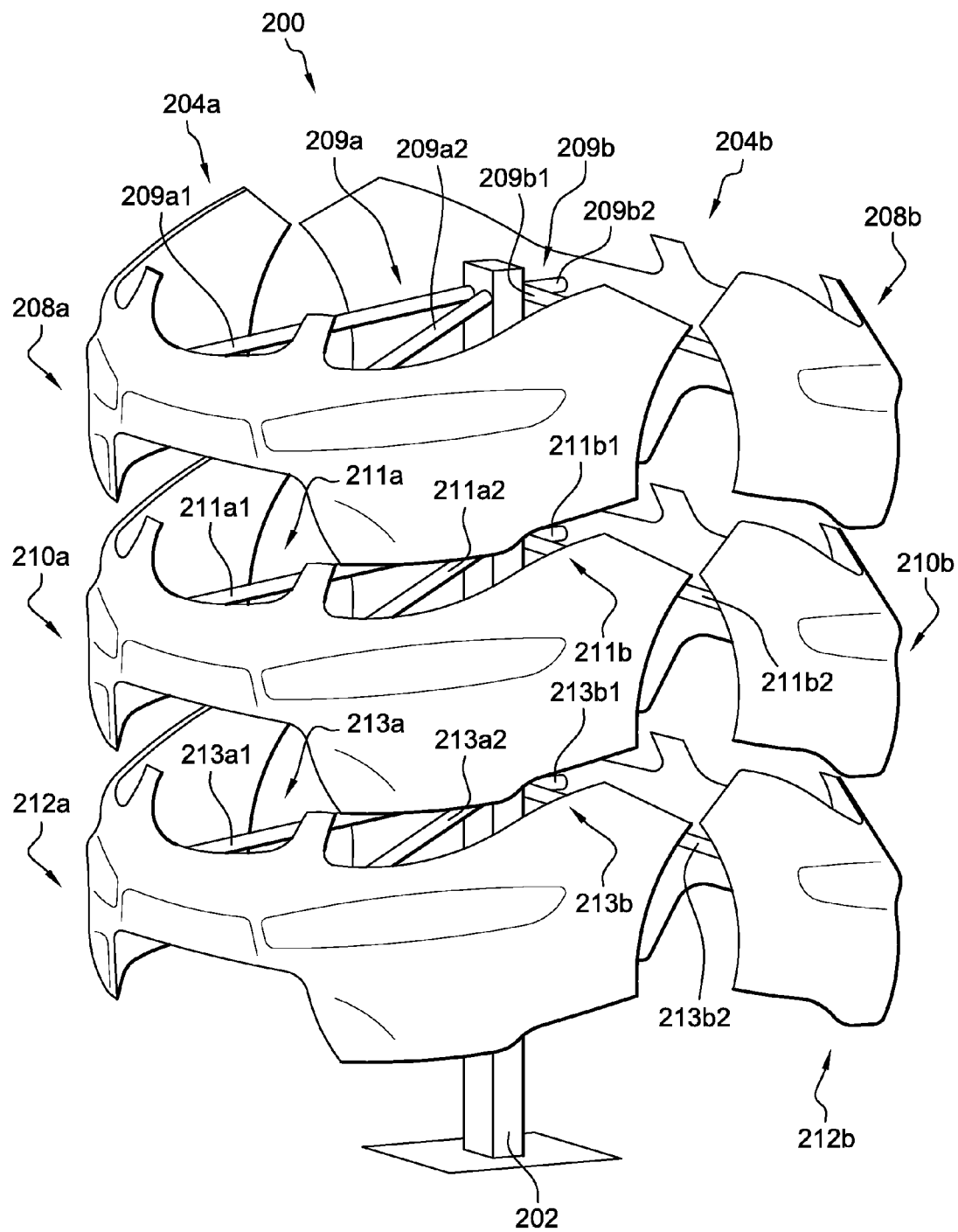
FIG. 8 is a perspective view of a set of body parts painted by a painting method in a second implementation.

FIG. 8 shows a set of body parts for painting by a painting method in a second implementation of the invention.

In FIG. 8, elements analogous to those shown in the above-described figures are designated by identical references.

The installation 200 comprises a mask-forming support 202. The installation also includes first and second sets 204a and 204b each including three body parts. The first set 204a includes first, second, and third body parts 208a, 210a, and 212a. Each body part 208a, 210a, and 212a is independently fastened to the mask 202 via respective fastener means 209a, 211a, and 213a. Each fastener means 209a, 211a, and 213a includes two spacer bars 209a1 & 209a2, 211a1 & 211a2, and 213a1 & 213a2 projecting from the mask 202 as far as the corresponding body part. The second set 204b is arranged symmetrically to the first set 204a about a vertical plane P. The references for the second set 204b can be deduced mutatis mutandis from the references of the first set 204a.

FIG. 8 shows that the length of the spacer bars is a function of the distance needed for putting two body parts back to back without them touching. In the installation shown, the ends of the body parts are placed almost flush with one another so as to minimize the overall size of the installation. Thus, the body parts are formed so as to minimize the space occupied by two body parts placed back to back.

The invention is not limited in any way to the modes described above.

The body part might be made of sheet metal.

In addition, the body part might be made by injection molding, by compression, or by thermoforming.

The bumper skin may also include one or more aesthetic elements molded therewith or fitted thereon such as impact absorbers or fog lamp trim.

Independently of other characteristics, provision may be made in particular for a method of painting at least one first and one second body part, each forming a portion of a bumper skin, the first and second body parts being mutually identical, in which method paint is applied to each of the first and second body parts by means of an applicator that is movable in at most two dimensions.

Furthermore, it should be observed that the above-described characteristics:
 of the body part 11;
 of the masking elements 42, 44;
 of the support part 12;
 of the painting method; and
 of the assembly 10
may be implemented independently of one another and independently of the fact that the assembly comprises at least a first mounted element for masking the bottom edge and at least a second mounted element for masking a portion of the top edge that is complementary to the portion(s) of the top edge for masking by the member(s) once the assembly has been mounted on a vehicle, the first and second masking elements being fixed relative to the body part.

What is claimed is:
1. An assembly for mounting to a motor vehicle having a bumper skin, the assembly comprising:
 a body part forming at least a portion of the bumper skin of the motor vehicle once mounted to the motor vehicle,
 the body part being defined by bottom and top edges,
 the top edge including at least one first portion to be masked by at least one member of the motor vehicle that is to be fitted to the body part after the body part has been mounted to the motor vehicle,
 the assembly including:
  at least one first masking element masking at least one portion of the bottom edge of the body part, and
  at least one second masking element masking at least one second portion of the top edge of the body part, complementary to the at least one first portion of the top edge of the body part, the at least one second portion of the top edge of the body part being different from the at least one first portion of the top edge of the body part,
  the at least one first masking element and the at least one second masking element being fixed relative to the body part once the assembly is mounted to the motor vehicle,
 the bottom edge defining at least one recess formed in the body part, and the top edge defining at least one projection forming a visible portion of the body part once mounted on the motor vehicle, the body part being formed such that:
the at least one projection of the body part is suitable for being positioned in the at least one recess of a first other body part; and
the at least one recess of the body part is suitable for receiving the at least one projection of a second other body part.

2. An assembly according to claim 1, wherein the at least one member of the motor vehicle masking the at least one first portion of the top edge of the body part comprises a head light assembly.

3. An assembly for mounting to a motor vehicle having a bumper skin, the assembly comprising:
a body part forming at least a portion of the bumper skin of the motor vehicle once mounted to the motor vehicle,
the body part being defined by bottom and top edges,
the top edge including at least one first portion to be masked by at least one member of the motor vehicle that is to be fitted to the body part after the body part has been mounted to the motor vehicle,
the assembly including:
at least one first masking element masking at least one portion of the bottom edge of the body part, and
at least one second masking element masking at least one second portion of the top edge of the body part, complementary to the at least one first portion of the top edge of the body part, the at least one second portion of the top edge of the body part being different from the at least one first portion of the top edge of the body part,
the at least one first masking element and the at least one second masking element being fixed relative to the body part once the assembly is mounted to the motor vehicle,
the at least one first masking element and the at least one second masking element being integrally molded together.

4. An assembly for mounting to a motor vehicle having a bumper skin, the assembly comprising:
a body part forming at least a portion of the bumper skin of the motor vehicle once mounted to the motor vehicle,
the body part being defined by bottom and top edges,
the top edge including at least one first portion to be masked by at least one member of the motor vehicle that is to be fitted to the body part after the body part has been mounted to the motor vehicle,
the assembly including:
at least one first masking element masking at least one portion of the bottom edge of the body part, and
at least one second masking element masking at least one second portion of the top edge of the body part, complementary to the at least one first portion of the top edge of the body part, the at least one second portion of the top edge of the body part being different from the at least one first portion of the top edge of the body part,
the at least one first masking element and the at least one second masking element being fixed relative to the body part once the assembly is mounted to the motor vehicle,
the at least one first masking element and the at least one second masking element being connected together by elastically deformable connecters.

5. An assembly for mounting to a motor vehicle having a bumper skin, the assembly comprising:
a body part forming at least a portion of the bumper skin of the motor vehicle once mounted to the motor vehicle,
the body part being defined by bottom and top edges,
the top edge including at least one first portion to be masked by at least one member of the motor vehicle that is to be fitted to the body part after the body part has been mounted to the motor vehicle,
the assembly including:
at least one first masking element masking at least one portion of the bottom edge of the body part, and
at least one second masking element masking at least one second portion of the top edge of the body part, complementary to the at least one first portion of the top edge of the body part, the at least one second portion of the top edge of the body part being different from the at least one first portion of the top edge of the body part,
the at least one first masking element and the at least one second masking element being fixed relative to the body part once the assembly is mounted to the motor vehicle, and
a support part supporting the body part including:
a support portion supporting the body part; and
a visible portion that is visible from outside the vehicle once the assembly is mounted to the motor vehicle, the visible portion having the at least one first masking element and the at least one second masking element.

6. An assembly according to claim 1, wherein the body part further comprises integrally molded fasteners fastening the body part to the at least one first masking element and to-the at least one second masking element.

7. An assembly according to claim 1, wherein at least one of the at least one first masking element and the at least one second masking element includes at least one aesthetic element.

8. An assembly according to claim 1, wherein the body part includes at least one fastener for fastening the body part to at least one other identical body part when such body parts are not assembled to a motor vehicle.

9. A motor vehicle, comprising an assembly according to claim 1.

10. An assembly for mounting to a motor vehicle having a bumper skin, the assembly comprising:
a body part forming at least a portion of the bumper skin of the motor vehicle once mounted to the motor vehicle,
the body part being defined by bottom and top edges,
the top edge including at least one first portion to be masked by at least one member of the motor vehicle that is to be fitted to the body part after the body part has been mounted to the motor vehicle,
the assembly including:
at least one first masking element masking at least one portion of the bottom edge of the body part, and
at least one second masking element masking at least one second portion of the top edge of the body part, complementary to the at least one first portion of the top edge of the body part, the at least one second portion of the top edge of the body part being different from the at least one first portion of the top edge of the body part,
the at least one first masking element and the at least one second masking element being fixed relative to the body part once the assembly is mounted to the motor vehicle,
the body part being shaped such that when a first other body part identical to the body part and a second other body part identical to the body part are mounted vertically on top of each other, each of the body part, the first other body part and the second other body part being in the utilization position of the body part on the vehicle, the first other body part being mounted above the body part, and the second other body part being mounted below the body part:

any portion of the top edge of the body part which is convex when projected onto a plane perpendicular to the longitudinal direction in the utilization position of the body part on the vehicle, has a corresponding portion on the bottom edge of the first other body part which is at least one of concave and flat when projected onto the plane, and any portion of the bottom edge of the body part which is at least one of concave and flat when projected onto the plane, has a corresponding portion on the top edge of the second other body part which is convex when projected onto the plane.

11. An assembly for mounting to a motor vehicle having a bumper skin, the assembly comprising:

a body part forming at least a portion of the bumper skin of the motor vehicle once mounted to the motor vehicle, the body part being defined by bottom and top edges, the top edge including at least one first portion to be masked by at least one member of the motor vehicle that is to be fitted to the body part after the body part has been mounted to the motor vehicle, the assembly including:

at least one first masking element masking at least one portion of the bottom edge of the body part, and at least one second masking element masking at least one second portion of the top edge of the body part, complementary to the at least one first portion of the top edge of the body part, the at least one second portion of the top edge of the body part being different from the at least one first portion of the top edge of the body part, the at least one first masking element and the at least one second masking element being fixed relative to the body part once the assembly is mounted to the motor vehicle, the body part being shaped such that when a first other body part identical to the body part and a second other body part identical to the body part are mounted vertically on top of each other, each of the body part, the first other body part and the second other body part being in the utilization position of the body part on the vehicle, the first other body part being mounted above the body part, and the second other body part being mounted below the body part:

any portion of the top edge of the body part which is at least one of concave and flat when projected onto a plane perpendicular to the longitudinal direction in the utilization position of the body part on the vehicle, has a corresponding portion on the bottom edge of the first other body part which is convex when projected onto the plane, and any portion of the bottom edge of the body part which is convex when projected onto the plane, has a corresponding portion on the top edge of the second other body part which is at least one of concave and flat when projected onto the plane.

12. An assembly according to claim 5, wherein the at least one first masking element and the at least one second masking elements are made of plastic material.

13. An assembly according to claim 10, wherein the aesthetic element is an air inlet grille.

* * * * *